United States Patent Office 2,900,437
Patented Aug. 18, 1959

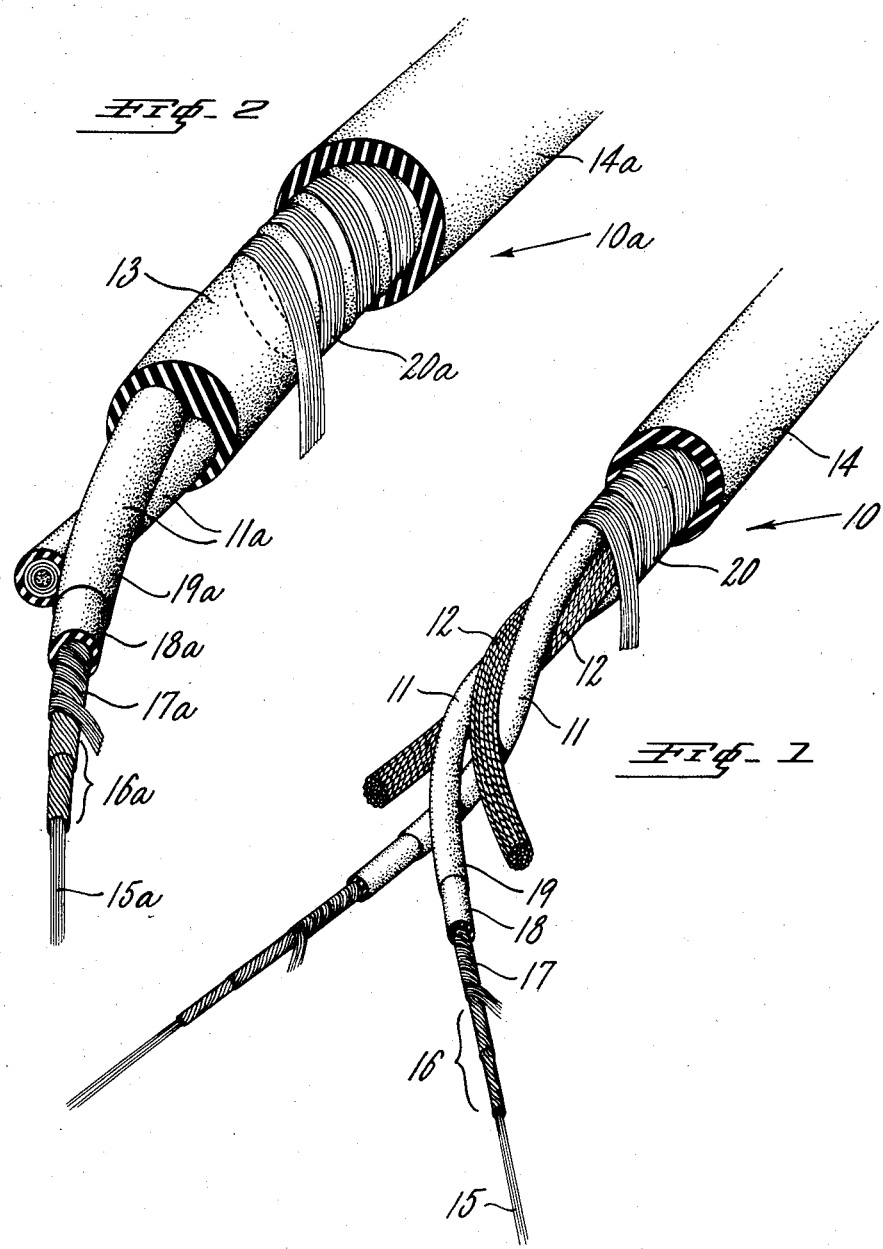

2,900,437

PORTABLE ELECTRIC CORD

Paul F. Thompson, Bristol, R.I., assignor, by mesne assignments, to Kaiser Aluminum & Chemical Corporation, Oakland, Calif., a corporation of Delaware Application November 4, 1954, Serial No. 466,814

4 Claims. (Cl. 174—116)

This invention relates to an electric cord and more particularly to a portable electric cord of high resistance to flex fatigue, good flexibility, high impact resistance and high overall tensile strength.

One use to which the electric cord of the present invention may be put is as a power lead to portable tools or other equipment having moving components in a machine shop. In such service the electric power leads are subject to frequent twists, blows, kinks or flexing which may result in a rapid failure of the cord.

It is an object of this invention to provide an improved construction in electric cords which has increased durability and in which the conductors are so arranged as to resist the hard impact blows, twisting and flexing stresses inevitably applied to such portable electric cords.

The above and other objects and advantages of the present invention will become apparent upon consideration of the following description when read in connection with the accompanying drawing.

In the drawing,

Fig. 1 is a perspective view of one embodiment of an electric cord constructed in accordance with the invention, certain parts being partially cut away in order to clearly illustrate other parts which would not normally be visible; and Fig. 2 is a partial view similar to Fig. 1 showing another and larger embodiment of the invention.

Referring to Figs. 1 and 2, like numerals indicate like parts in both figures; however, all numerals in Fig. 2 corresponding to those in Fig. 1, are provided with letter suffixes in order to indicate greater size. An electric cord 10 or 10a is formed with a plurality of insulated conductors 11 or 11a which are twisted together and combined with filler material 12 (Fig. 1) or 13 (Fig. 2), to form an assembly which is enclosed within an outer jacket 14 or 14a of elastomeric material. Such an assembly is particularly well adapted for use as a portable electric cord.

In use, such portable electric cords must have high overall tensile strength and particularly must be capable of withstanding repeated blows, twists and flexing without breakage of the conductors or damage to the insulation. To this end, each insulated conductor 11 or 11a is made with a core 15 or 15a of fibrous material comprising a plurality of soft, substantially straight and parallel strands such as cotton, nylon, rayon, glass fibers, or the like. A plurality of fine metallic strands 16 or 16a are wrapped around the core 15 or 15a in substantially parallel relationship, thereby forming two or more substantially complete layers. Strands 16 or 16a are preferably made of cadmium bronze wires or tin coated copper wires. An inner serving 17 or 17a of fibrous material such as any of those specified for core 15 or 15a, is wrapped around metallic strands 16 or 16a in the same direction of lay as the metallic strands. Serving 17 or 17a preferably comprises a plurality of strands which are laid in substantially parallel relationship. The insulated conductor 11 or 11a is completed by a relatively thin elastomeric cover comprising one or more layers of the same or different elastomers each of which may be applied over serving 17 or 17a in any conventional manner. Nevertheless, it is preferred that the cover comprise an insulating layer 18 or 18a and a thinner, outer protective layer or covering 19 or 19a, both of these elastomeric layers being deposited from latex. Layer 18 or 18a is preferably made of natural rubber having high insulating properties while layer 19 or 19a is preferably made of polychloroprene for increased resistance to oil, light and ozone. Each of the aforementioned layers are applied over serving 17 or 17a by the conventional dipping process and cured in a well-known manner.

This particular construction of the insulated conductor 11 or 11a has the advantage that the core 15 or 15a can deform better under impact, twisting or flexure. Under hard impact blows the core acts as a cushion as the strands 16 or 16a are deformed or flattened, and thus permits a transfer of strain from the metallic strands 16 or 16a to more durable parts of the core such as filler material 12 or 13 and outer jacket 14 or 14a. The core provides a surface of less frictional resistance than other materials such as rubber, and consequently more freedom for the metallic strands 16 or 16a to flex about and move under stress. Moreover, the core 15 or 15a provides a protective mass capable of allowing the metallic strands 16 or 16a to become embedded therein, and it can be used as a reservoir for holding lubricants such as waxes and greases, to further reduce the friction between the metallic strands 16 or 16a, thereby decreasing their susceptibility to flexing and twisting fatigue.

When tensile stress is applied to cord 10 or 10a, the resulting strain normally accepted by the conductor in conventional cords will be absorbed by the fibrous core 15 or 15a because the metallic conductor strands 16 or 16a are longer per linear cord length and capable of withstanding greater elongation without breaking than the core itself. The conductor strands are longer than the core because the former are wrapped around the latter in a spiral, while the strands of the core are substantially straight and parallel. Moreover, the conductor strands are capable of withstanding greater elongation because of the inherently greater elongation of the metal as compared to the fibrous material. If cord 10 or 10a is simultaneously subjected to twisting and tensile stress in service, the fibrous core 15 or 15a will remain as an effective absorber of resulting stresses and strains because the substantially straight and parallel strands thereof will keep the effective length of the core less than that of the conductor strands 16 or 16a, regardless of the direction of twist.

The metallic strands 16 or 16a of cadmium bronze or tin coated copper, are protected against mutual contamination between the strands and the compounding chemicals in the layer 18 or 18a. In addition, strands 16 or 16a are laid substantially parallel to each other in order to produce maximum softness and flexibility as compared to a solid metallic conductor or one composed of groups of metallic strands. Using two or more substantially complete layers of metallic strands permits close dimensional control of the completed insulated conductor.

The inner serving 17 or 17a provides freedom of movement and protection for metallic strands 16 or 16a against direct contact with the insulating layer 18 or 18a. Moreover, the substantially parallel relationship between the individual strands of serving 17 or 17a contributes to the flexibility of conductor 11 or 11a. By wrapping the serving 17 or 17a in the same direction of lay as that of conductor 16 or 16a, the flexibility of the conductor is increased since the strands are not held tightly around the core 15 or 15a, which would be the case if the serving were applied with a reverse direction of lay. Although a shorter lay may be used if desired, the lay of inner serving 17 or 17a is preferably made as long as, or longer than the lay of metallic strands 16 or 16a. By thus increasing the lay of serving 17 or 17a, the flex life of the conductor is further increased and the applied tensile stress is absorbed by the serving along with core 15 or 15a.

An advantage of using an elastomer such as natural rubber deposited from latex in the insulating layer 18 or 18a, is that the total thickness required for adequate insulation is much less than that necessary in the usual portable cord of this general type employing an elastomer such as extruded natural rubber. For example, let cord 10 of Fig. 1 represent an AWG size 16 cord of two conductors, each conductor having 65 strands and each strand being .0063 inch in diameter. A conventional cord of the same specifications would require a cover at least .031 inch thick around each conductor. In cord 10 insulating layer 18 is only .015 inch thick because of the greater insulating and physical properties of the natural rubber deposited from latex. The addition of outer protective cover 19, which is merely .003 inch thick, and which is made of polychloroprene deposited from latex for increased resistance to oil, light and ozone, makes a total cover only .018 inch thick. The cord 10a, illustrated in Fig. 2, compares just as favorably with conventional cords of the same size in the amount of insulation required as cord 10. As an example, let cord 10a comprise an AWG size 10 cord of two conductors, each conductor having 104 strands and each strand being .010 inch in diameter. A conventional cord of the same size would require an insulating cover .047 inch thick around each conductor. In cord 10a, however, the insulating layer 18a is only .018 inch thick, while outer layer 19a is merely .003 inch thick, making a total cover of only .021 inch in thickness. Therefore, even though the overall outer diameter of metallic strands 16 or 16a may be increased by core 15 or 15a to a size greater than that of a conventional metal conductor, the relatively thin elastomeric cover comprising layers 18 or 18a and 19 or 19a permits manufacture of cord 10 or 10a with the same or smaller outside dimensions than cords of conventional design. At the same time the improved design is much more flexible and durable.

The conductors 11 or 11a thus constructed are then twisted together and combined with filler material 12 or 13 to form an assembly. The reasons for using different filler materials with the respective conductors will be apparent from the following description.

Upon comparing Figs. 1 and 2, it will be evident that cord 10 of Fig. 1 is smaller than cord 10a of Fig. 2. Cord 10 is representative of AWG size 14 cords and smaller, while cord 10a is representative of AWG size 12 cords and larger. For cords of AWG size 14 and smaller, the Underwriters Laboratories have set up a minimum pull strength requirement which, of course, varies with the size and the number of conductors used. It has been found through experience that a material other than an elastomer must be used as a filler in order to provide the additional strength in order to meet this minimum pull strength requirement, and this is accomplished by the fibrous fillers 12 illustrated in cord 10 of Fig. 1. Although it would be preferable from a strength standpoint to employ fibrous fillers in cords larger than AWG size 14, it has also been found through experience that elastomeric filler material such as 13 in cord 10a of Fig. 2, provides sufficient strength for normal usage. Moreover, it has been found to be more economical to use an elastomer as a filler material in the larger size cords. Another important factor in the choice of filler material is flex life. It has been found that in normal use the smaller cords are more subject to flexure stress than the larger cords. The fibrous filler material is superior to an elastomer in this respect and would thus be employed in such smaller cords in preference to an elastomer.

Referring now to Fig. 1, conductors 11 are twisted together with each other and with a plurality of fibrous fillers 12. Each of the fillers is preferably made of a plurality of substantially parallel strands such as any of those specified for core 15. These conductors and fillers are twisted together to form an assembly, and the direction of twist is preferably in the same direction of lay as that of metallic strands 16. The assembly thus formed is substantially in the desired cylindrical shape because the substantially parallel strands of fillers 12 can readily deform to fill the spaces between conductors 11.

Upon reference to Fig. 2, it will be noted that the elastomeric filler material 13, which may be extruded over the twisted conductors 11a in a conventional manner, completely surrounds the latter, thus forming the desired cylindrically shaped assembly. With its resilient qualities the elastomeric filler material 13 permits the twisted conductors 11a to flex and twist under applied stress; it also provides a cushion to protect the conductors against heavy impact blows. In order to prevent mutual contamination between filler 13 and cover 19a, the filler material is selected from an elastomer which will not unduly react with the cover 19a, and in cord 10a this material is preferably the same as that used for outer jacket 14a. Moreover, bonding between filler material 13 and cover 19a is prevented by dusting the latter with soapstone prior to the aforementioned extrusion step.

Referring once again to Figs. 1 and 2, an outer serving 20 or 20a of fibrous material encloses the assembly of twisted conductors 11 or 11a and filler material 12 or 13. This serving preferably comprises a plurality of fibrous strands, such as any of those specified for core 15 or 15a, and which are wrapped around the assembly in substantially parallel relationship and in the same direction of lay as twisted conductors 11 or 11a and metallic strands 16 or 16a. The only difference between servings 20 and 20a is that the strands of the former are contiguous to provide a closed serving, while the strands of the latter are spaced to provide an open serving, each serving being constructed for a specific purpose described below.

The advantages of using outer serving 20 or 20a are as follows. In the cord illustrated in Fig. 1, closed serving 20 provides a barrier between the cover 19 and outer jacket 14, whereby adhesion between and mutual contamination of both components are prevented. In the cord shown in Fig. 2, open serving 20a permits bonding between filler 13 and outer jacket 14a to provide a double jacket of the required thickness over conductors 11a and at the same time reinforces outer jacket 14a. When either cord is subjected to a twisting action, serving 20 or 20a permits greater freedom of movement to the conductors 11 or 11a than a braid or a serving wrapped in the opposite direction of lay. Serving 20 or 20a also protects the conductors 11 or 11a by providing a cushioning action under impact stress and by providing resistance to cuts caused by sharp instruments. In addition, this serving aids in anchoring outer jacket 14 or 14a to the underlying assembly.

The cord 10 or 10a is then completed by an outer jacket or covering 14 or 14a of elastomeric material. This jacket is preferably made of a polychloroprene compound which has high tensile strength and high resistance to cutting, tearing, abrasion, oil, light, ozone, natural aging and flame. The jacket may be applied over serving 20 or 20a by a conventional extrusion process and cured in a well-known manner.

It will be noted that throughout the preceding description various components of cord 10 or 10a have been referred to as being wrapped or twisted in a specific direction of lay. Normally, a braid or a wrap applied in the opposite direction to the lay of the twisted conductors is employed to cover the latter. However, the interwoven and oppositely wound strands in such constructions bind the underlying conductors and filler material against movement under applied stress. Therefore, whenever the cord is twisted, flexed or struck, the conductors must bear a considerable amount of the induced strain.

In contrast, the strands of serving 20 (Fig. 1) permit the twisted conductors 11 and fillers 12 to move relative to each other, and thus fillers 12 can more readily be formed to relieve the strain in conductors 11. In Fig. 2, serving 20a allows the elastomeric filler material 13 to resiliently deform, thereby permitting relative movement between conductors 11a and relieving the latter from the induced strain. It is important that the strands of serving 20 or 20a be wrapped in the same direction of lay as the twist of conductors 11 and fillers 12, or the twist of conductors 11a, because an opposite lay or braid would severely limit the capacity of the conductors and filler material to flex or twist. It is preferable that the strands of serving 20 or 20a be wrapped in the same direction of lay as metallic strands 16 or 16a in order to provide the strands with as much flexibility of movement under stress as possible. An opposite lay would produce a binding and stiffening effect upon metallic strands 16 or 16a which would partially offset the flexibility imparted thereto by core 15 or 15a.

It has also been conventional practice to wrap a serving directly around a standard conductor in a direction of lay opposite to that of the conductor strands. Once again, a binding and stiffening effect is produced on the conductor strands. In the present construction, inner serving 17 or 17a is preferably wrapped in the same direction of lay as metallic strands 16 or 16a whereby the latter are permitted much more freedom of movement. As is now apparent, the incorporation of a uni-directional lay throughout the construction of cord 10 or 10a produces a substantial increase in its ability to resiliently deform under frequent twists, blows, kinks or flexing and thus results in a corresponding increase in cord life.

The term "lay" as used herein means the amount of advance of any point in a strand for one complete turn. The terms "elastomer" and "elastomeric" as used herein include the materials classified as elastomers by Fisher in the table on page 942 of "Industrial and Engineering Chemistry," vol. 31 (1939), materials which have become available since the Fisher article and which are commonly recognized as being elastomeric in nature, and suitable combinations of such elastomeric materials. Examples of such materials are "Butyl" rubber, Buna N, GR-S, "Thiokol," neoprene, polybutenes, plasticized polyvinyl chloride and copolymers of a major proportion of vinyl chloride and a minor proportion of a copolymerizable monomer, e.g., vinyl acetate, mixtures of resins and rubbers, which mixtures are elastomeric in nature, e.g., a mixture of polyvinyl chloride and Buna N, etc.

Although only two embodiments of the invention have been shown and described, and a certain mode of manufacturing the same has been referred to, it is to be understood that the invention is not so limited and that it may be practiced as defined in the appended claims.

Having thus described my invention, what I claim and desire to protect by Letters Patent is:

1. A portable electric cord having high resistance to flex fatigue comprising a plurality of insulated conductors, each conductor comprising a core of substantially straight and parallel fibrous strands, a plurality of layers of metallic strands wrapped around said core in substantially parallel relationship, an inner serving comprising a plurality of fibrous strands wrapped around said metallic strands in substantially parallel relationship and in the same direction of lay as said metallic strands, and a relatively thin elastomeric cover composed of a plurality of thin layers deposited from latex surrounding said inner serving one of said thin layers comprising an insulating layer for the conductor and another thinner layer comprising a protective covering for said insulating layer, the insulated conductors being twisted together in the same direction of lay as said metallic strands and combined with filler material to form an assembly, an outer serving comprising a plurality of fibrous strands wrapped around said assembly in substantially parallel relationship and in the same direction of lay as the twist of said conductors and an outer elastomeric covering surrounding said outer serving.

2. The cord as recited in claim 1 wherein the insulating layer is natural rubber and the protective covering is polychloroprene.

3. The cord as recited in claim 1 wherein the filler material comprises a plurality of fibrous fillers twisted in the same direction of lay as said metallic strands.

4. The cord as recited in claim 1 wherein the filler material comprises an elastomeric material surrounding said twisted conductors.

References Cited in the file of this patent

UNITED STATES PATENTS

| 1,200,319 | Currier | Oct. 3, 1916 |
| 1,698,704 | Middleton | Jan. 10, 1925 |
| 2,004,592 | Alden | May 12, 1933 |
| 2,043,401 | Wells | June 9, 1936 |
| 2,093,501 | Williams | Sept. 21, 1937 |
| 2,235,523 | Hull | Mar. 18, 1941 |

OTHER REFERENCES

"Flexible Cords and Fixture Wire," General Cable Corporation Catalog FC-37, 1938, pages 8, 9, and 12. (Copy in Div. 69.)